United States Patent [19]

Henry

[11] 4,300,849
[45] Nov. 17, 1981

[54] BALL JOINT REPAIR PART

[75] Inventor: Roger J. Henry, Dayton, Ohio

[73] Assignee: Don Kremer Lincoln-Mercury, Inc., Dayton, Ohio

[21] Appl. No.: 264,877

[22] Filed: May 18, 1981

[51] Int. Cl.³ .......................... B25G 3/00; F16D 1/00; F16G 11/00
[52] U.S. Cl. ................................. 403/11; 29/402.15; 280/511; 285/90; 403/317
[58] Field of Search .............. 403/11, 56, 69, 76, 403/122, 133, 141, 142, 302, 308, 348, 353, 376, 317; 29/402.14, 402.15; 128/92, 92 B; 172/749, 753; 285/45, 404, 90; 267/120; 280/511

[56] References Cited

U.S. PATENT DOCUMENTS

| | | | |
|---|---|---|---|
| 1,410,908 | 3/1922 | Garman | 403/115 |
| 2,118,394 | 5/1938 | Bullis | 70/232 UX |
| 2,458,209 | 1/1949 | Sawatzki | 280/511 |
| 2,513,637 | 7/1950 | Herreshoff et al. | 403/122 |
| 2,859,060 | 11/1958 | Davies et al. | 403/122 |
| 3,034,813 | 4/1962 | Buell et al. | 403/122 |
| 3,041,886 | 7/1962 | Atherton | 74/102 |
| 3,124,971 | 3/1964 | Peters et al. | 403/56 X |
| 3,191,977 | 6/1977 | Saratinas | 403/142 |
| 3,269,760 | 8/1966 | Seckerson | 403/122 |
| 3,969,951 | 7/1976 | Blackwood | 74/473 |
| 4,236,845 | 12/1980 | Smith et al. | 403/144 |

Primary Examiner—Wayne L. Shedd
Attorney, Agent, or Firm—Biebel, French & Nauman

[57] ABSTRACT

A repair part for a small ball joint is provided in the form of a sleeve open at least at one end and having a flattened section extending from that one end toward its middle. A slot extends lengthwise of the flattened section and is open at the one end of said sleeve to embrace the shank of the ball part of the joint. A retainer member extends inwardly from the wall of the sleeve at a location generally opposite the end of said slot, for engaging the socket part of the joint and holding the sleeve around the assembled joint.

2 Claims, 7 Drawing Figures

U.S. Patent    Nov. 17, 1981    4,300,849
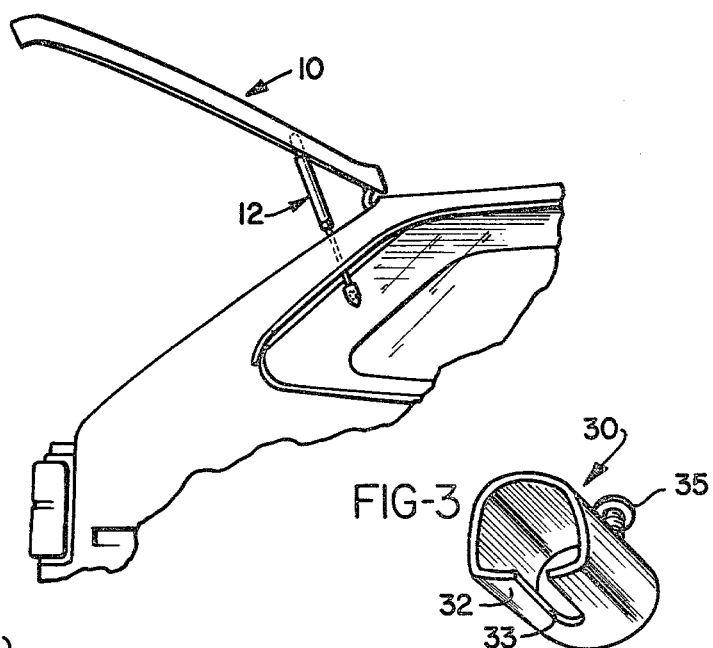
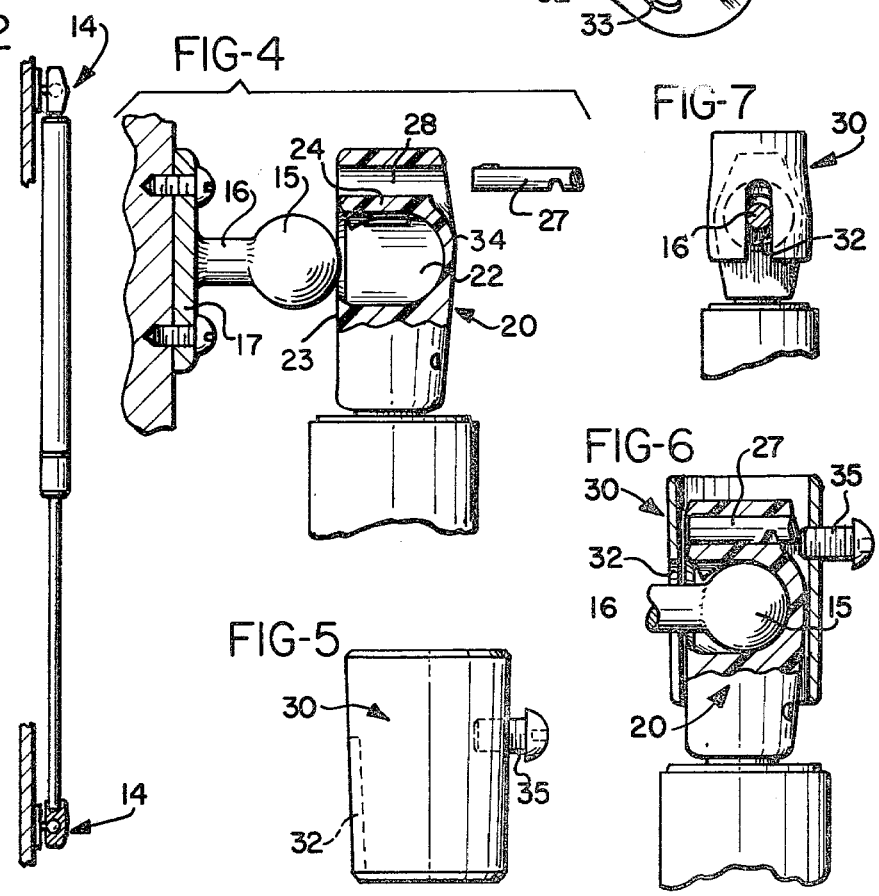

4,300,849

BALL JOINT REPAIR PART

BACKGROUND OF THE INVENTION

Changes in the design of automobiles, particularly recent trends toward smaller more fuel efficient designs, have resulted in new body styles, and one significant feature which appears in the various models of different manufacturers is the so-called hatchback door for easy access to the rear interior of the smaller automobiles. Many of these hatchback doors utilize a device which is often referred to as a "gas spring" to urge the door into a raised open position. In reality, these are small cylinder-piston devices which extend in a linear direction under the force of gas which is trapped under pressure between the piston and the head of the cylinder. The head of the cylinder has a ball socket, usually integrally formed with the cylinder, which engages a ball on the body framework or on the door, and the end of the piston likewise has a similar socket, often integrally or at least non-removably formed to the outer end of the piston rod, and adapted to engage a further ball on the door or on the body framework. In practice, one of these devices is employed at each side of the hatchback door.

A noticeable problem has been recognized by owners of automobiles having these devices, due to the wear on the gas spring mechanism. The ball joints at its ends must transverse a rather large angle, and at time the forces on the parts, particularly on the sockets, are directed substantially away from the longitudinal center line of the devices. Since these devices are mass produced and often use molded plastic parts, there is a tendency for the plastic ball sockets to distort, enlarge, or tear, and eventually to release from the ball where the stress tends to be concentrated. Failure at either end, in the past, has required the automobile owner to buy an entire replacement assembly, due to the integral or non-removable nature of the ball sockets on the devices.

Not only are structurally sound parts wasted, but from the viewpoint of the consumer there is unneeded monetary expenditure to replace the entire gas spring assembly, when only the ball joint has failed. The present invention has been developed in response to this problem and need.

SUMMARY OF THE INVENTION

The present invention involves a repair part in the nature of a replacement or repair tubular sleeve member that is designed to encompass a fractured or failing ball joint connection. The sleeve can be constructed of a wide choice of material, so long as there is sufficient strength, and proper size to adapt to the various sizes and styles of ball joints needing repair. In general, the part comprises a sleeve which may be made of ordinary carbon steel or the like, open at least at one end, preferably at both ends, and having a length sufficient to encompass most of the ball socket part. At the open end of the sleeve at least a portion of the sleeve is flattened in a direction extending lengthwise of the tubular sleeve. This results in the open end of the sleeve having a cross-sectional configuration generally semi-circular about a portion of the end perimeter, and generally straight over a segment of that perimeter opposite the semi-circular portion. In this flattened section there is formed a slot which has an open end at the perimeter of the flattened section, and a closed end at the interior of the flattened section, approximately midway lengthwise of the sleeve. The sleeve thus can be fitted over the ball socket with the ball in place, and the slot receives and moves around the shank of the ball, as the sleeve is pressed into place.

Generally opposite the inner closed end of the slot there is a retainer device, such as a small screw, flexible tab, or equivalent, which extends radially inward opposite the end of the slot. This retainer engages into a cavity which exists in most of the molded ball socket parts, or the retainer can have a point which can embed into the plastic of the ball socket, thus serving to retain the sleeve in its operative position.

The primary object of the invention, therefore, is to provide such a repair sleeve member which enables rapid repair of small ball joints, particularly those joints where the ball socket part is integrally formed with other mechanism, without the necessity of removing the ball and socket parts from their mountings or adjoining parts, and without the need to replace either the ball or the molded socket.

Other objects and advantages of the invention will be apparent from the following description, the accompanying drawings and the appended claims.

BRIEF DESCRIPTION OF THE DRAWINGS

FIG. 1 illustrates a typical hatchback automobile door in the open position, exhibiting use of a gas spring type of mechanism to support the door weight;

FIG. 2 shows a typical gas spring mechanism including ball joint connections at its opposite ends;

FIG. 3 is a perspective view of the repair part of the present invention;

FIG. 4 is a exploded detail view of a typical ball joint connecting a gas spring mechanism to a door and/or a frame part;

FIG. 5 is a side view of the repair sleeve;

FIG. 6 is a cross-sectional view illustrating the present invention in position reinforcing a damaged ball joint; and FIG. 7 is a side view showing the manner in which the slot in the repair sleeve embraces the shank of the ball part of the joint.

DESCRIPTION OF THE PREFERRED EMBODIMENT

Referring the drawings, FIG. 1 shows a typical hatchback door 10 on an automobile, supported in open position by so-called "gas spring" devices, one of which is shown generally at 12, and shown in greater detail in FIG. 2. The ball and socket joints, hereinafter called ball joints, are shown formed on the end of the cylinder head and the end of the piston rod, these joints being indicated by the general reference numeral 14 in FIG. 2.

As seen in greater detail in FIG. 4, the joint includes a ball 15 formed with a smaller generally cylindrical shank 16 secured to a mounting plate 17 that can be fastened to any desired surface with suitable mounting screws, bolts, etc. The socket part 20 is formed of a suitable molded plastic and the hemi-spherical socket cavity 22 is formed and one side 23 thereof, including a flexible wall part 24 with a tang 25 that can be engaged around the ball 15, but which can be moved by flexing of the wall 24 to snap or force the ball and socket together. A lock pin 27 is insertable in a passage 28 through the head of the socket part, in order to hold the wall 24 against the ball, once the parts are joined.

FIG. 3 shows in perspective the replacement or repair sleeve part 30 of the invention, which is formed as a relatively rigid tubular part, for example a length of carbon steel tubing of appropriate inner diameter which is initially circular in cross-section. The sleeve is of a length, as can be seen in FIG. 6, sufficient to embrace substantially all of the socket part 20, and to surround the shank 16 of the ball part, as hereinafter explained.

The flattened portion of the sleeve is shown generally at 32 in FIG. 3. This portion extends from one end of the sleeve generally longitudinally, approximately to the middle of the sleeve or slightly beyond, and thus the shape of the perimeter at the one end of the sleeve where it is flattened is generally hemi-spherical as shown in FIG. 3 about part of the perimeter, and then generally flattened or straight across the opposite side of the perimeter. Projecting inward along the flattened portion 32 there is a slot 33 which opens at the end of the sleeve, and has a closed or terminal end approximately at the middle of the sleeve. The width of this slot is slightly greater than the diameter (or width) of the shank 16 of the ball part.

At the opposite wall of the sleeve from the slot 32, generally across from the terminal end of the slot, there is a retaining means projecting generally radially inward of the sleeve, to engage the back 34 of the socket part 20 particularly in the region of the retaining pin 27. In the embodiment shown, this retaining means is in the form of a small screw 35 which is threaded through a hole in the wall of the sleeve and can be adjusted inward, pressing against the outer surface of the socket part, and preferably pressing against the end of the pin 27, to hold the sleeve in place. It would of course be possible for the end of the screw or other retaining means to have a pointed end which would embed in the plastic of the socket if desired.

The repair sleeve is applied simply by engaging the ball in the socket, then slipping the sleeve over the socket part into the position shown in FIG. 6, with the shank of the ball located in the slot 33, at which time the retaining means is engaged, for example by threading the screw 35 inward, to hold the sleeve on the assembled joint. Preferably the slot 33 extends somewhat beyond the shank, in order to allow for a range of angular movement of the ball with respect to the socket part, such as may be necessary to accommodate the motion of the device in normal use.

While the form of apparatus herein describe constitutes preferred embodiment of this invention, it is to be understood that the invention is not limited to this precise form of apparatus, and that changes may be made therein without departing from the scope of the invention which is defined in the appended claims.

What is claimed is:

1. In combination with a ball joint having a plastic socket part, including a generally hemi-spherical socket cavity having an opening extending outward through one side of said socket part, a ball member seated in said cavity and including a shank extending from said ball member through said opening, said shank being substantially smaller in cross-section than the largest cross-section of said ball member, said socket part having a back and including a movable wall part defining part of said cavity and engaged with said ball member to retain said ball member in said cavity;

the improvement comprising a sleeve of rigid material open at least at one end and having a flattened section extending from said one end toward the middle of said sleeve, means defining a slot extending lengthwise of said flattened section and terminating adjacent the middle of said sleeve, said slot opening into said one end of said sleeve, said slot being of greater width than said shank and of less width than said ball member, said sleeve being dimensioned to embrace substantially all of said socket part and said ball member seated in said cavity, and said shank being received in said slot to reinforce the retaining action of said socket part and to prevent release of said ball member from said cavity, and a retainer means extending transversely inward of said sleeve toward said closed end of said slot and being adjustable toward and away from said slot to engage with said back of said socket part, whereby said sleeve can be attached to the assembled ball joint by moving said sleeve lengthwise over said socket part, engaging said shank in said slot, and moving said retainer means against said back of said socket part to hold said sleeve on the assembled joint.

2. A repair part as defined in claim 1, wherein said sleeve member is an integral tubular sleeve and said retainer means is a screw threaded through the wall of said sleeve member.

* * * * *